US012104689B2

(12) United States Patent
Wang

(10) Patent No.: US 12,104,689 B2
(45) Date of Patent: Oct. 1, 2024

(54) CONTROL DEVICE FOR GEARBOX

(71) Applicants: ZF WIND POWER (TIANJIN) CO., LTD., Tianjin (CN); ZF Wind Power Antwerpen N.V., Lommel (BE)

(72) Inventor: Fuliang Wang, Tianjin (CN)

(73) Assignees: ZF WIND POWER (TIANJIN) CO., LTD, Tianjin (CN); .ZF WIND POWER ANTWERPEN N.V., Lommel (BE)

( * ) Notice: Subject to any disclaimer, the term of this patent is extended or adjusted under 35 U.S.C. 154(b) by 0 days.

(21) Appl. No.: 18/693,536

(22) PCT Filed: Aug. 29, 2022

(86) PCT No.: PCT/CN2022/115432
§ 371 (c)(1),
(2) Date: Mar. 20, 2024

(87) PCT Pub. No.: WO2023/045706
PCT Pub. Date: Mar. 30, 2023

(65) Prior Publication Data
US 2024/0263696 A1 Aug. 8, 2024

(30) Foreign Application Priority Data
Sep. 23, 2021 (CN) .......................... 202111116494.6

(51) Int. Cl.
*F16H 57/04* (2010.01)
*F16H 3/50* (2006.01)
(Continued)

(52) U.S. Cl.
CPC ......... *F16H 57/0435* (2013.01); *F16H 48/08* (2013.01); *F16H 48/22* (2013.01);
(Continued)

(58) Field of Classification Search
CPC .. F16H 3/50; F16H 57/0435; F16N 2210/025; F16N 13/10; F03D 80/705; F03D 80/707; F03D 80/70
(Continued)

(56) References Cited

U.S. PATENT DOCUMENTS

| 1,625,564 A * | 4/1927 | Pollard ...................... F16H 3/50 |
| | | 475/308 |
| 2010/0056315 A1* | 3/2010 | Scholte-Wassink .... F03D 80/50 |
| | | 700/282 |
| 2012/0241258 A1* | 9/2012 | Subramaniam ........... F16N 7/40 |
| | | 184/6.4 |

FOREIGN PATENT DOCUMENTS

| CN | 202381670 U | 8/2012 |
| CN | 111350660 A | 6/2020 |

(Continued)

*Primary Examiner* — Sherry L Estremsky
(74) *Attorney, Agent, or Firm* — LEYDIG, VOIT & MAYER, LTD.

(57) ABSTRACT

A control device for a gearbox which includes a mechanical pump and an electric pump, the control device including a sensor module configured to detect a system oil pressure of a lubricating oil of the gearbox, a differential, a clutch, a brake, and a control module. The differential includes an input bevel gear meshing with a bevel pinion of an output shaft of the gearbox, a differential housing connected to the input bevel gear, and a first half shaft and a second half shaft which are provided in the differential housing and mesh with a bevel pinion of the differential housing. The second half shaft is connected to an input of the mechanical pump. The brake includes a brake caliper, a brake disc, and a brake disc shaft fixedly connected to the brake disc. The brake disc shaft is fixedly connected to the first half shaft.

8 Claims, 2 Drawing Sheets

(51) Int. Cl.
*F16H 48/08* (2006.01)
*F16H 48/22* (2006.01)
*F16H 48/32* (2012.01)
*F16H 48/40* (2012.01)

(52) U.S. Cl.
CPC ............ *F16H 48/32* (2013.01); *F16H 48/40* (2013.01); *F16H 57/0439* (2013.01); *F16H 3/50* (2013.01)

(58) Field of Classification Search
USPC ...................................................... 184/27.1
See application file for complete search history.

(56) References Cited

FOREIGN PATENT DOCUMENTS

| | | | | |
|---|---|---|---|---|
| CN | 212615359 U | 2/2021 | | |
| CN | 215980760 U | 3/2022 | | |
| DE | 102011010771 A1 * | 8/2011 | ............ | F03D 80/70 |
| JP | 59082512 A * | 5/1984 | | |
| JP | 2003139230 A | 5/2003 | | |
| KR | 20100026866 A | 3/2010 | | |

* cited by examiner

CONTROL DEVICE FOR GEARBOX

CROSS REFERENCE TO RELATED APPLICATIONS

This application is a U.S. National Phase application under 35 U.S.C. § 371 of International Application No. PCT/CN2022/115432, filed on Aug. 29, 2022, and claims benefit to Chinese Patent Application No. 202111116494.6, filed on Sep. 23, 2021. The International Application was published in Chinese on Mar. 30, 2023 as WO 2023/045706 A1 under PCT Article 21(2).

FIELD

The present invention relates to a control device, and in particular, to a control device for an oil pump of a wind turbine gearbox.

BACKGROUND

A wind turbine gearbox is configured to transmit a torque between a main shaft, which is connected to a wind wheel, and an engine, and generally uses a planetary gear train to achieve speed increasing. In an operation process of the gearbox, it is necessary to lubricate various components of the planetary gear train, in particular, a gear meshing portion and a bearing, to ensure normal operation of the gearbox. In a current wind turbine gearbox system, there is a dual oil pump design with a mechanical pump and an electric pump, where the mechanical pump is powered by the rotation of a wind wheel, while the electric pump is powered entirely by external electricity.

However, in a low lubricating oil temperature situation, the electric pump is not activated or operates at a quite low rotation speed, so that a low flow is provided by the electric pump. Therefore, in this case, the mechanical pump is primarily responsive for circulation of lubricating oil in the gearbox for lubrication. Generally, a displacement of the mechanical pump is designed based on a rated load and a rated speed of the gearbox, and a flow of the mechanical pump is entirely determined by an input speed of the gearbox. However, when the input speed of the gearbox is low, a rotation speed of the mechanical pump is also low, which leads to insufficient oil supply. Further, insufficient oil may result in insufficient lubrication of a part such as a gear and a bearing in the gearbox, so that operation and lifetime of the gearbox may be affected.

If, to overcome this problem, the displacement of the mechanical pump is designed based on the low input rotation speed situation, an excessive flow may occur under a rated operating condition, which may cause a high oil pressure, so that a risk of oil leakage is increased, and energy consumption of the gearbox is increased.

SUMMARY

In an embodiment, the present disclosure provides a control device for a gearbox which comprises a mechanical pump and an electric pump, the control device comprising a sensor module configured to detect a system oil pressure of a lubricating oil of the gearbox, a differential, a clutch, a brake, and a control module. The differential comprises an input bevel gear meshing with a bevel pinion of an output shaft of the gearbox, a differential housing connected to the input bevel gear, and a first half shaft and a second half shaft which are provided in the differential housing and mesh with a bevel pinion of the differential housing. The second half shaft is connected to an input of the mechanical pump. The brake comprises a brake caliper, a brake disc, and a brake disc shaft fixedly connected to the brake disc. The brake disc shaft is fixedly connected to the first half shaft. An outer disc of the clutch is connected to the differential housing, and an inner disc of the clutch is sleeved on the first half shaft. The control module is configured to actuate, when the system oil pressure is below a system oil pressure threshold, the brake caliper to clamp the brake disc and release the clutch, such that a rotation speed of the first half shaft is zero, and a rotation speed of the second half shaft is twice that of the differential housing, and the control module is configured to release the brake caliper and close the clutch when the system oil pressure is above the system oil pressure threshold, such that the inner disc and the outer disc rotate synchronously, and the rotation speed of the first half shaft is the same as that of the second half shaft.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
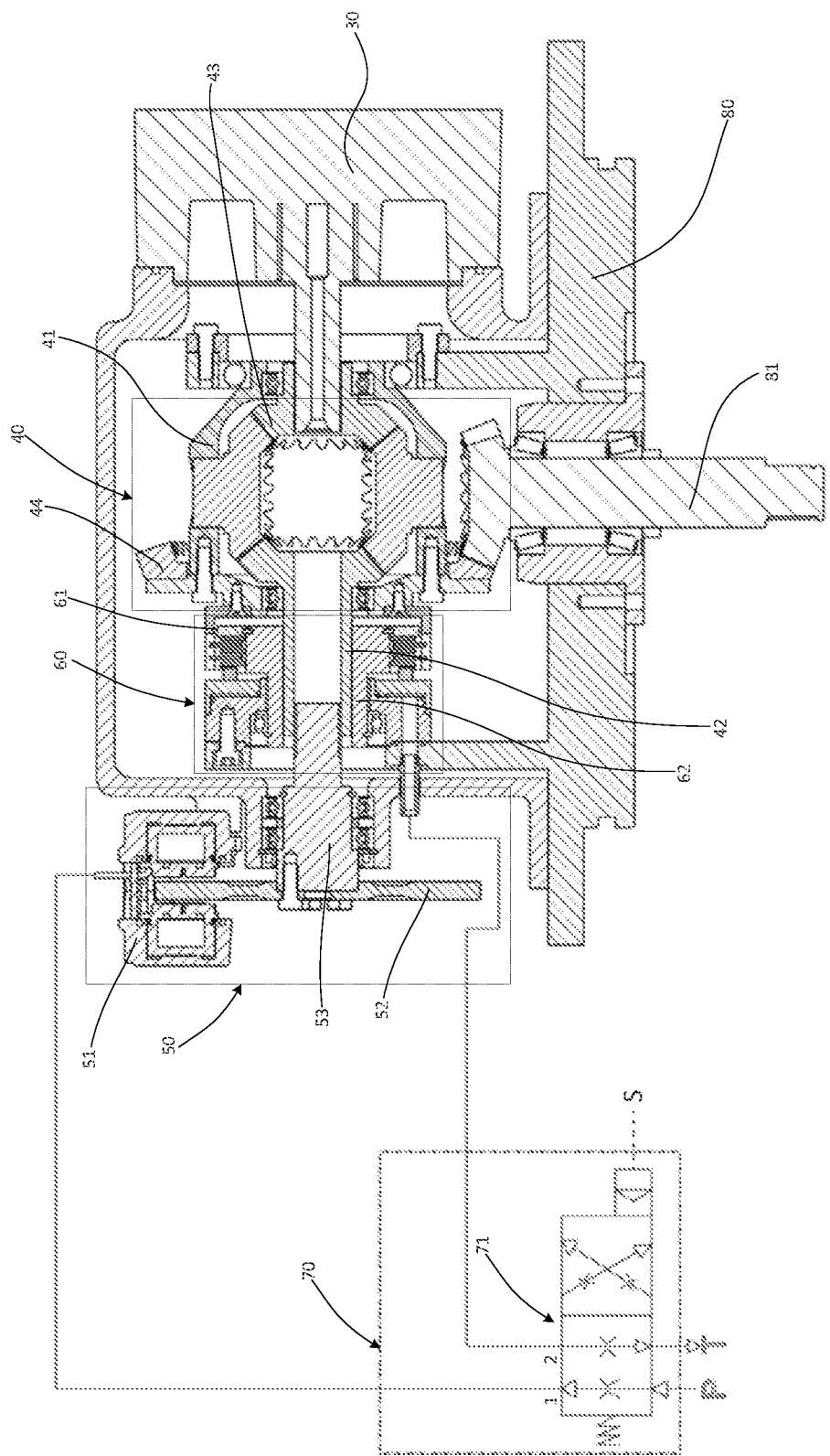
FIG. 1 is a schematic diagram of a control device according to an embodiment of the present invention.

To resolve the defect in the prior art that the use of a mechanical pump with a fixed displacement is difficult to meet different lubrication requirements of a rated operating condition and a special operating condition, a control device for a gearbox is provided, which can adapt to the different lubrication requirements of the rated operating condition and the special operating condition.

In an embodiment, the present invention provides:

a control device for a gearbox which comprises a mechanical pump and an electric pump, the control device comprising: a sensor module configured to detect a system oil pressure of a lubricating oil of the gearbox, a differential, a clutch, a brake, and a control module, wherein the differential comprises an input bevel gear meshing with a bevel pinion of an output shaft of the gearbox, a differential housing connected to the input bevel gear, and a first half shaft and a second half shaft which are provided in the differential housing and mesh with a bevel pinion of the differential housing, wherein the second half shaft is connected to an input of the mechanical pump, due to the configuration of the differential, a sum of rotation speeds of the first half shaft and the second half shaft is twice a rotation speed of the differential housing, and power distribution on the two half shafts is obtained by introducing the differential;

the brake comprises a brake caliper, a brake disc, a brake disc shaft fixedly connected to the brake disc, wherein the brake disc shaft is fixedly connected to the first half shaft; an outer disc of the clutch is connected to the differential housing, and an inner disc of the clutch is sleeved on the first half shaft; and the control module is configured to actuate, when the system oil pressure is below a system oil pressure threshold, that is, when high-speed operation of the mechanical pump is required, the brake caliper to clamp the brake disc and release the clutch, such that a rotation speed of the first half shaft is zero, and a rotation speed of the second half shaft is twice that of the differential housing, and the control module is configured to release the brake caliper and close the clutch when the system oil pressure is above the system oil pressure threshold, that is, under a rated operating condition, such that the inner disc and the outer disc rotate synchronously, and the rotation speed of the first half shaft is the same as that of the second half shaft.

Preferably, the control module comprises a two-position four-way valve, the two-position four-way valve comprising an oil inlet and an oil outlet which are connected to an oil tank, a first oil port connected to the brake, and a second oil port connected to the clutch, wherein when the system oil pressure is below the system oil pressure threshold, a valve core of the two-position four-way valve is located in a first position, such that a passage is established between the first oil port and the oil inlet to actuate the brake caliper, and a passage is established between the second oil port and the oil outlet to release the clutch; and when the system oil pressure is above the system oil pressure threshold, the valve core of the two-position four-way valve is located in a second position, such that a passage is established between the second oil port and the oil inlet to close the clutch, and a passage is established between the first oil port and the oil outlet to release the brake caliper.

Preferably, the two-position four-way valve is hydraulically controlled, or controlled through an electrical signal.

Preferably, the two-position four-way valve is provided with a damping hole.

Preferably, the sensor module is further configured to detect a first oil pressure of the mechanical pump, and a second oil pressure of the electric pump, respectively; and the control module is configured to actuate, when the first oil pressure is below a first threshold, and the second oil pressure is below a second threshold, the brake caliper to clamp the brake disc and release the clutch, such that the rotation speed of the first half shaft is zero, and the rotation speed of the second half shaft is twice that of the differential housing, the control module is configured to release the brake caliper and close the clutch the first oil pressure is above the first threshold, and the second oil pressure is below the second threshold, such that the inner disc and the outer disc rotate synchronously, and the rotation speed of the first half shaft is the same as that of the second half shaft, and the control module is configured to release the brake caliper and the clutch when the second oil pressure is above the second threshold, that is, when lubrication relies on the electric pump and operation of the mechanical pump is not required, such that the rotation speed of the second half shaft is zero, and the rotation speed of the first half shaft is twice that of the differential housing.

Preferably, the control module comprises a two-position four-way valve, a first two-position three-way valve, and a second two-position three-way valve, wherein the two-position four-way valve comprises an oil inlet and a first oil outlet which are connected to an oil tank, a first oil port, and a second oil port; the first two-position three-way valve comprises a second oil outlet, a third oil port connected to the first oil port, and a fourth oil port connected to the brake;

the second two-position three-way valve comprises a third oil outlet, a fifth oil port connected to the second oil port, and a sixth oil port connected to the clutch;

wherein when the first oil pressure is below the first threshold, and the second oil pressure is below the second threshold, valve cores of the two-position four-way valve, the first two-position three-way valve and the second two-position three-way valve are each located in a first position, such that passages are established between the first oil port and the oil inlet, and between the third oil port and the fourth oil port, respectively, to actuate the brake caliper, and passages are established between the fifth oil port and the sixth oil port, and between the second oil port and the first oil outlet, respectively, to release the clutch;

when the first oil pressure is above the first threshold, and the second oil pressure is below the second threshold, the valve core of the two-position four-way valve is located in a second position, and the valve cores of the first two-position three-way valve and the second two-position three-way valve are each located in the first position, such that passages are established between the second oil port and the oil inlet, and between the fifth oil port and the sixth oil port, respectively, to close the clutch, and passages are established between the first oil port and the first oil outlet, and between the third oil port and the fourth oil port, respectively, to release the brake caliper; and when the second oil pressure is above the second threshold, the valve cores of the first two-position three-way valve and the second two-position three-way valve are each located in the second position, such that a passage is established between the fourth oil port and the second oil outlet to release the brake caliper, and a passage is established between the sixth oil port and the third oil outlet to release the clutch.

Preferably, the two-position four-way valve, the first two-position three-way valve, and the second two-position three-way valve are each hydraulically controlled, or controlled through an electrical signal.

Preferably, the two-position four-way valve, the first two-position three-way valve, and the second two-position three-way valve are each provided with a damping hole.

The technical effects obtained by embodiments of the present invention are as follows: Combination of the differential, the clutch and the brake enables the mechanical pump to adapt to requirements of different operating conditions, thereby avoiding potential risks to the gearbox resulting from insufficient lubrication under low-speed and/or low-temperature conditions, and excessive oil under the rated operating condition.

Figure 2:
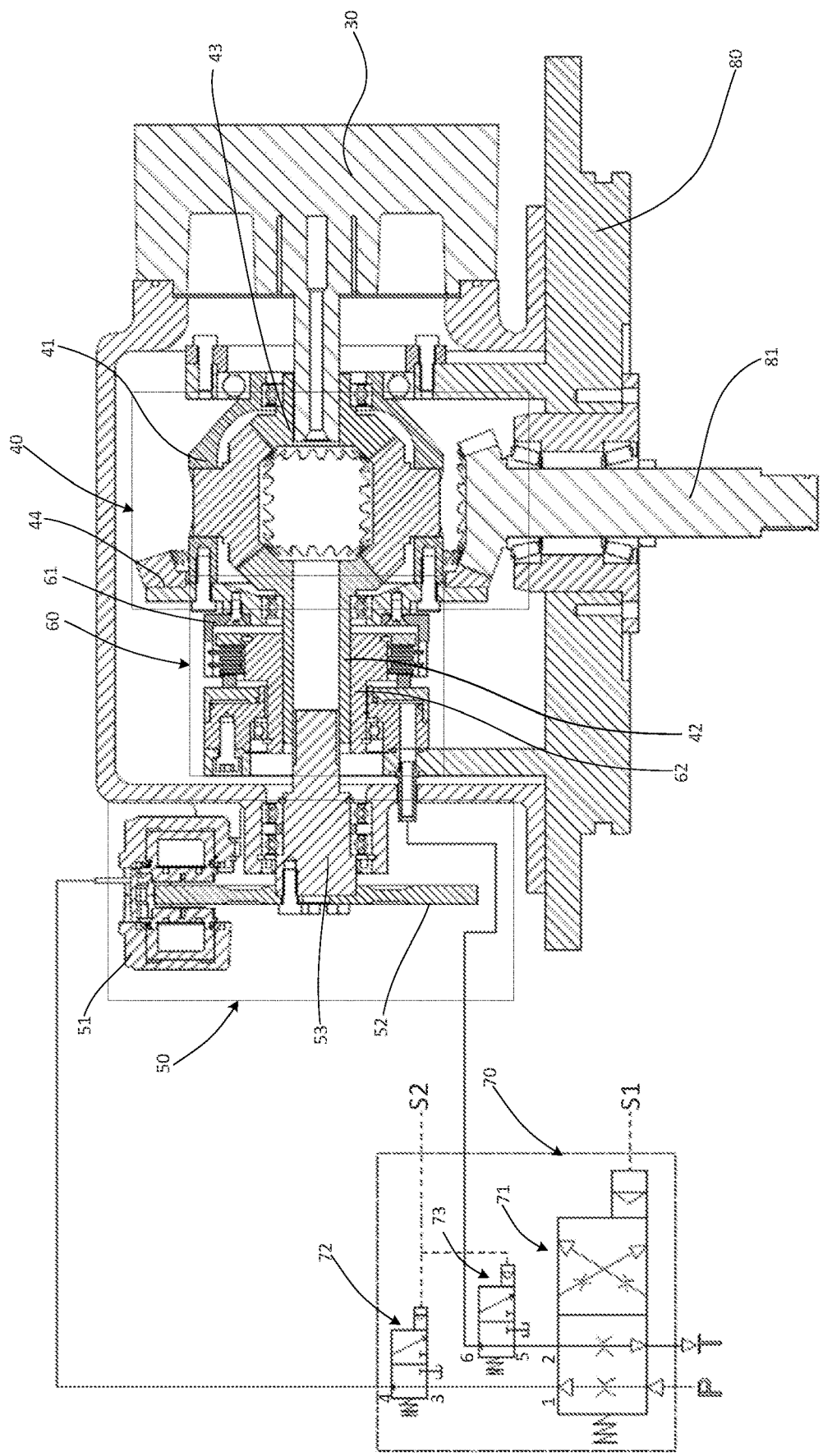
FIG. 2 is a schematic diagram of a control device according to an embodiment of the present invention.

Referring to FIGS. 1 and 2, embodiments of the present invention will be further described below with reference to the accompanying drawings.

Referring to FIG. 1, a control device for a gearbox according to an embodiment is suitable for a gearbox comprising a mechanical pump 30 and an electric pump. Power of the mechanical pump 30 originates from an output of the gearbox. In FIG. 1, a gearbox housing is denoted with 80, and an output shaft, used to drive the mechanical pump 30 to operate, of the gearbox is denoted with 81.

The control device comprises a sensor module configured to detect a system oil pressure of a lubricating oil of the gearbox, a differential 40, a clutch 60, a brake 50, and a control module 70. In this embodiment, power is transmitted by the output shaft 81 provided with a bevel pinion to the differential 40, which implements power distribution together with the clutch 60 and the brake 50, thereby allowing the mechanical pump 30 to obtain different rotation speed ratios.

Specifically, the differential 40 comprises an input bevel gear 44 meshing with a bevel pinion of an output shaft 81 of the gearbox, a differential housing 41 connected to the input bevel gear 44, and a first half shaft 42 and a second half shaft 43 which are provided in the differential housing 41 and mesh with a bevel pinion of the differential housing 41. The second half shaft 43 is connected to an input of the mechanical pump 30. According to the configuration of the differential 40, a sum of rotation speeds of the first half shaft 42 and the second half shaft 43 is twice a rotation speed of the differential housing 41.

The brake 50 comprises a brake caliper 51, a brake disc 52, a brake disc shaft 53 fixedly connected to the brake disc 52. The brake disc shaft 53 is fixedly connected to the first half shaft 42, and therefore the brake disc shaft 53 and the first half shaft 42 move synchronously, or are static.

In the clutch 60, an outer disc 61 of the clutch is connected to the differential housing 41, and an inner disc 62 of the clutch is sleeved on the first half shaft 42.

The control module 70 is configured to actuate, when the system oil pressure is below a system oil pressure threshold, the brake caliper 51 to clamp the brake disc 52 and release the clutch 60 (in which the outer disc 61 and the inner disc 62 of the clutch are not in contact and do not rotate synchronously), such that a rotation speed of the first half shaft 42 is zero, and a rotation speed of the second half shaft 43 is twice that of the differential housing 41, and the control module is configured to release the brake caliper 51 and close the clutch when the system oil pressure is above the system oil pressure threshold, such that the inner disc and the outer disc rotate synchronously, and the rotation speed of the first half shaft 42 is the same as that of the second half shaft 43.

Specifically, the control module comprises a two-position four-way valve 71. The two-position four-way valve 71 comprises an oil inlet P and an oil outlet T which are connected to an oil tank, a first oil port 1 connected to the brake 50, and a second oil port 2 connected to the clutch 60. When the system oil pressure is below the system oil pressure threshold, a valve core of the two-position four-way valve is located in a first position (a left position), such that a passage is established between the first oil port 1 and the oil inlet P, to actuate the brake caliper 51, and a passage is established between the second oil port 2 and the oil outlet T, to release the clutch. In this case, the first half shaft 42 is static because it is clamped by the brake caliper 51, so that the rotation speed of the first half shaft 42 is zero, the rotation speed of the second half shaft 43 connected to the mechanical pump 30 is twice that of the differential housing 41, and the mechanical pump 30 is thus at a high speed, and can provide a high volume of oil for the gearbox. This operating condition corresponds to a situation in which the electric pump does not operate, or operates at an extremely low rotation speed, and thus supply of the lubricating oil relies on the mechanical pump.

When the system oil pressure is above the system oil pressure threshold, the valve core of the two-position four-way valve is located in a second position (a right position), such that a passage is established between the second oil port 2 and the oil inlet P to close the clutch, and a passage is established between the first oil port 1 and the oil outlet T, so that oil in the brake 50 returns to the oil tank to release the brake caliper. In this case, a rotation speed of the brake disc is the same as that of the first half shaft 42. Since the outer disc 61 and the inner disc 62 of the clutch rotate synchronously, the rotation speed of the first half shaft 42 is the same as that of the differential housing 41 connected to the outer disc 61 of the clutch. Therefore, at this point, the rotation speeds of the first half shaft 42, the differential housing 41 and the second half shaft 43 are all the same. The rotation speed of the mechanical pump 30 is lower than that in the previous case. Correspondingly, under a rated operating condition of the gearbox, there is no need to operate the mechanical pump at a high speed for more lubricating oil.

The two-position four-way valve 71 is hydraulically controlled, or controlled through an electrical signal, and is actuated according to a signal S detected by the sensor module. The two-position four-way valve is provided with a damping hole, to avoid an impact of the actuation of the brake and the closing of the clutch on the oil pressure.

Reference is made to FIG. 2, which shows a control device for a gearbox according to an embodiment of the present invention. The control device can be configured to control three different operating conditions of the mechanical pump.

Specifically, the sensor module is further configured to detect each of a first oil pressure of the mechanical pump and a second oil pressure of the electric pump (denoted with S1 and S2, respectively), and to determine operating states of the mechanical pump and the electric pump based on the detection of the first oil pressure and the second oil pressure.

In this embodiment, the control module is configured to actuate, when the first oil pressure is below a first threshold, and the second oil pressure is below a second threshold (the electric pump is basically not operating), the brake caliper 51 to clamp the brake disc 52 and release the clutch 60, such that the rotation speed of the first half shaft 42 is zero, and the rotation speed of the second half shaft 43 is twice that of the differential housing 41, the control module is configured to release the brake caliper 51 and close the clutch 60 the first oil pressure is above the first threshold, and the second oil pressure is below the second threshold, such that the inner disc 62 and the outer disc 61 rotate synchronously, and the rotation speed of the first half shaft 42 is the same as that of the second half shaft 43, and the control module is configured to release the brake caliper 51 and the clutch 60 when the second oil pressure is above the second threshold, such that the rotation speed of the second half shaft is zero, and the rotation speed of the first half shaft is twice that of the differential housing, with the mechanical pump not operating.

Referring to FIG. 2, the control module 70 comprises a two-position four-way valve 71, a first two-position three-way valve 72, and a second two-position three-way valve 73. The two-position four-way valve 71 comprises an oil inlet P and a first oil outlet T which are connected to an oil tank, a first oil port 1, and a second oil port 2; the first two-position three-way valve 72 comprises a second oil outlet, a third oil port 3 connected to the first oil port 1, and a fourth oil port 4 connected to the brake 50; and the second two-position three-way valve 73 comprises a third oil outlet, a fifth oil port 5 connected to the second oil port 2, and a sixth oil port 6 connected to the clutch 60.

When the first oil pressure is below the first threshold, and the second oil pressure is below the second threshold, the mechanical pump is required to operate at a high speed, valve cores of the two-position four-way valve 71, the first two-position three-way valve 72, and the second two-position three-way valve 73 are each located in a first position (a left position), such that passages are established between the first oil port 1 and the oil inlet P, and between the third oil port 3 and the fourth oil port 4, respectively, to actuate the brake caliper 51, and passages are established between the fifth oil port 5 and the sixth oil port 6, and between the second oil port 2 and the first oil outlet T, respectively, to release the clutch 60. In this way, the rotation speed of the first half shaft 42 is zero, the rotation speed of the second half shaft 43 (and the mechanical pump 30) is twice that of the differential housing 41, and the mechanical pump is operating at a high speed, which corresponds to an operating condition in which the electric pump is basically not operating.

Under a rated operating condition of the gearbox in which the gearbox operates normally, that is, when the first oil pressure is above the first threshold, and the second oil pressure is below the second threshold, the valve core of the two-position four-way valve 71 is located in a second position (a right position), and the valve cores of the first two-position three-way valve 72 and the second two-position three-way valve 73 are each located in the first position (the left position), such that passages are established between the second oil port 2 and the oil inlet P, and between the fifth oil port 5 and the sixth oil port 6, respectively, to close the clutch 60, and passages are established between the first oil port 1 and the first oil outlet, and between the third oil port 3 and the fourth oil port 4, respectively, to release the brake caliper 51. In this case, the rotation speeds of the first half shaft 42, the second half shaft 43, and the differential housing 41 are all the same, so that the mechanical pump can adapt to requirements of the rated operating condition when operating at a low speed.

If the electric pump operates normally, circulation of the lubricating oil can be done by the electric pump, and the mechanical pump is used as a backup in the event of a power outage. That is, when the electric pump operates normally, the mechanical pump is not required to operate, and is in a standby operating condition with the rotation speed of zero. When the second oil pressure is above the second threshold, the valve cores of the first two-position three-way valve 72 and the second two-position three-way valve 73 are each located in the second position (the right position), such that a passage is established between the fourth oil port 4 and the second oil outlet to release the brake caliper 51, and a passage is established between the sixth oil port 6 and the third oil outlet to release the clutch 60. In this case, regardless of the position of the valve core of the two-position four-way valve 71, the brake caliper and the clutch are released, the rotation speed of the first half shaft 42 is twice that of the differential housing 41, and the rotation speed of the second half shaft 43 is zero, that is, the mechanical pump is not operating.

The two-position four-way valve, the first two-position three-way valve, and the second two-position three-way valve are each hydraulically controlled, or controlled through an electrical signal. To prevent fluctuations in the oil pressure, the two-position four-way valve, the first two-position three-way valve, and the second two-position three-way valve are each provided with a damping hole.

Combination of the differential, the clutch and the brake enables the mechanical pump to obtain different rotation speeds under different operating conditions, to adapt to the requirements of a current operating condition.

Although specific embodiments of the present invention are described above, it should be appreciated by those skilled in the art that these are merely illustrative. Various changes or modifications to these embodiments can be made by those skilled in the art without departing from the principle and spirit of the present invention, and these changes or modifications fall within the scope of the present invention.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A control device for a gearbox which comprises a mechanical pump and an electric pump, the control device comprising:
   a sensor module configured to detect a system oil pressure of a lubricating oil of the gearbox;
   a differential;
   a clutch;
   a brake; and
   a control module, wherein:
   the differential comprises an input bevel gear meshing with a bevel pinion of an output shaft of the gearbox, a differential housing connected to the input bevel gear, and a first half shaft and a second half shaft which are provided in the differential housing and mesh with a bevel pinion of the differential housing, wherein the second half shaft is connected to an input of the mechanical pump,
   the brake comprises a brake caliper, a brake disc, and a brake disc shaft fixedly connected to the brake disc, wherein the brake disc shaft is fixedly connected to the first half shaft,
   an outer disc of the clutch is connected to the differential housing, and an inner disc of the clutch is sleeved on the first half shaft, and
   the control module is configured to actuate, when the system oil pressure is below a system oil pressure threshold, the brake caliper to clamp the brake disc and release the clutch, such that a rotation speed of the first half shaft is zero, and a rotation speed of the second half shaft is twice that of the differential housing, and the control module is configured to release the brake caliper and close the clutch when the system oil pressure is above the system oil pressure threshold, such that the inner disc and the outer disc rotate synchronously, and the rotation speed of the first half shaft is the same as that of the second half shaft.

2. The control device according to claim 1, wherein the control module comprises a two-position four-way valve, the two-position four-way valve comprising an oil inlet and an oil outlet which are connected to an oil tank, a first oil port connected to the brake, and a second oil port connected to the clutch,
wherein when the system oil pressure is below the system oil pressure threshold, a valve core of the two-position four-way valve is located in a first position, such that a passage is established between the first oil port and the oil inlet to actuate the brake caliper, and a passage is established between the second oil port and the oil outlet to release the clutch, and
wherein when the system oil pressure is above the system oil pressure threshold, the valve core of the two-position four-way valve is located in a second position, such that a passage is established between the second oil port and the oil inlet to close the clutch, and a passage is established between the first oil port and the oil outlet to release the brake caliper.

3. The control device according to claim 2, wherein the two-position four-way valve is hydraulically controlled, or controlled through an electrical signal.

4. The control device according to claim 2, wherein the two-position four-way valve is provided with a damping hole.

5. The control device according to claim 1, wherein:
the sensor module is further configured to detect a first oil pressure of the mechanical pump, and a second oil pressure of the electric pump, respectively, and
the control module is configured to actuate, when the first oil pressure is below a first threshold, and the second oil pressure is below a second threshold, the brake caliper to clamp the brake disc and release the clutch, such that the rotation speed of the first half shaft is zero, and the rotation speed of the second half shaft is twice that of the differential housing, the control module is configured to release the brake caliper and close the clutch the first oil pressure is above the first threshold, and the second oil pressure is below the second threshold, such that the inner disc and the outer disc rotate synchronously, and the rotation speed of the first half shaft is the same as that of the second half shaft, and the control module is configured to release the brake caliper and the clutch when the second oil pressure is above the second threshold, such that the rotation speed of the second half shaft is zero, and the rotation speed of the first half shaft is twice that of the differential housing.

6. The control device according to claim 5, wherein the control module comprises a two-position four-way valve, a first two-position three-way valve, and a second two-position three-way valve,
wherein the two-position four-way valve comprises an oil inlet and a first oil outlet which are connected to an oil tank, a first oil port, and a second oil port,
wherein the first two-position three-way valve comprises a second oil outlet, a third oil port connected to the first oil port, and a fourth oil port connected to the brake,
wherein the second two-position three-way valve comprises a third oil outlet, a fifth oil port connected to the second oil port, and a sixth oil port connected to the clutch,
wherein when the first oil pressure is below the first threshold, and the second oil pressure is below the second threshold, valve cores of the two-position four-way valve, the first two-position three-way valve and the second two-position three-way valve are each located in a first position, such that passages are established between the first oil port and the oil inlet, and between the third oil port and the fourth oil port, respectively, to actuate the brake caliper, and passages are established between the fifth oil port and the sixth oil port, and between the second oil port and the first oil outlet, respectively, to release the clutch,
wherein when the first oil pressure is above the first threshold, and the second oil pressure is below the second threshold, the valve core of the two-position four-way valve is located in a second position, and the valve cores of the first two-position three-way valve and the second two-position three-way valve are each located in the first position, such that passages are established between the second oil port and the oil inlet, and between the fifth oil port and the sixth oil port, respectively, to close the clutch, and passages are established between the first oil port and the first oil outlet, and between the third oil port and the fourth oil port, respectively, to release the brake caliper, and
wherein when the second oil pressure is above the second threshold, the valve cores of the first two-position three-way valve and the second two-position three-way valve are each located in the second position, such that a passage is established between the fourth oil port and the second oil outlet to release the brake caliper, and a passage is established between the sixth oil port and the third oil outlet to release the clutch.

7. The control device according to claim 6, wherein the two-position four-way valve, the first two-position three-way valve, and the second two-position three-way valve are each hydraulically controlled, or controlled through an electrical signal.

8. The control device according to claim 6, wherein the two-position four-way valve, the first two-position three-way valve, and the second two-position three-way valve are each provided with a damping hole.

* * * * *